R. L. WEARNE.
REVERSIBLE POWER TRANSMISSION MECHANISM FOR WRINGERS.
APPLICATION FILED DEC. 16, 1912.
1,071,119.
Patented Aug. 26, 1913.
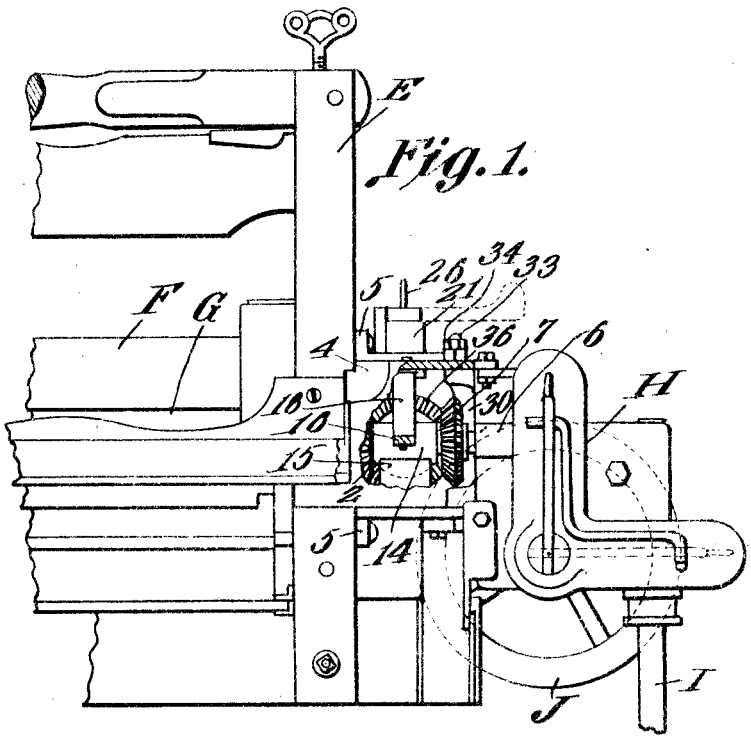
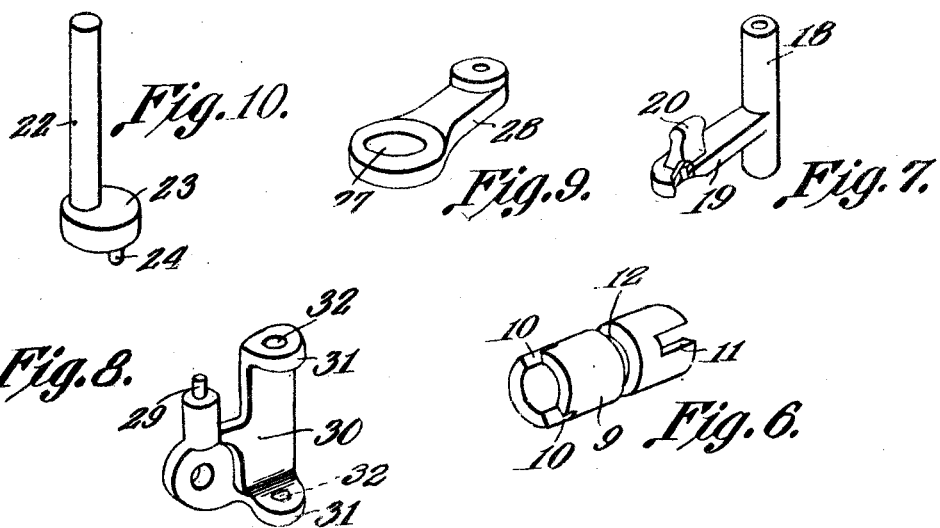
Richard L. Wearne,
Inventor

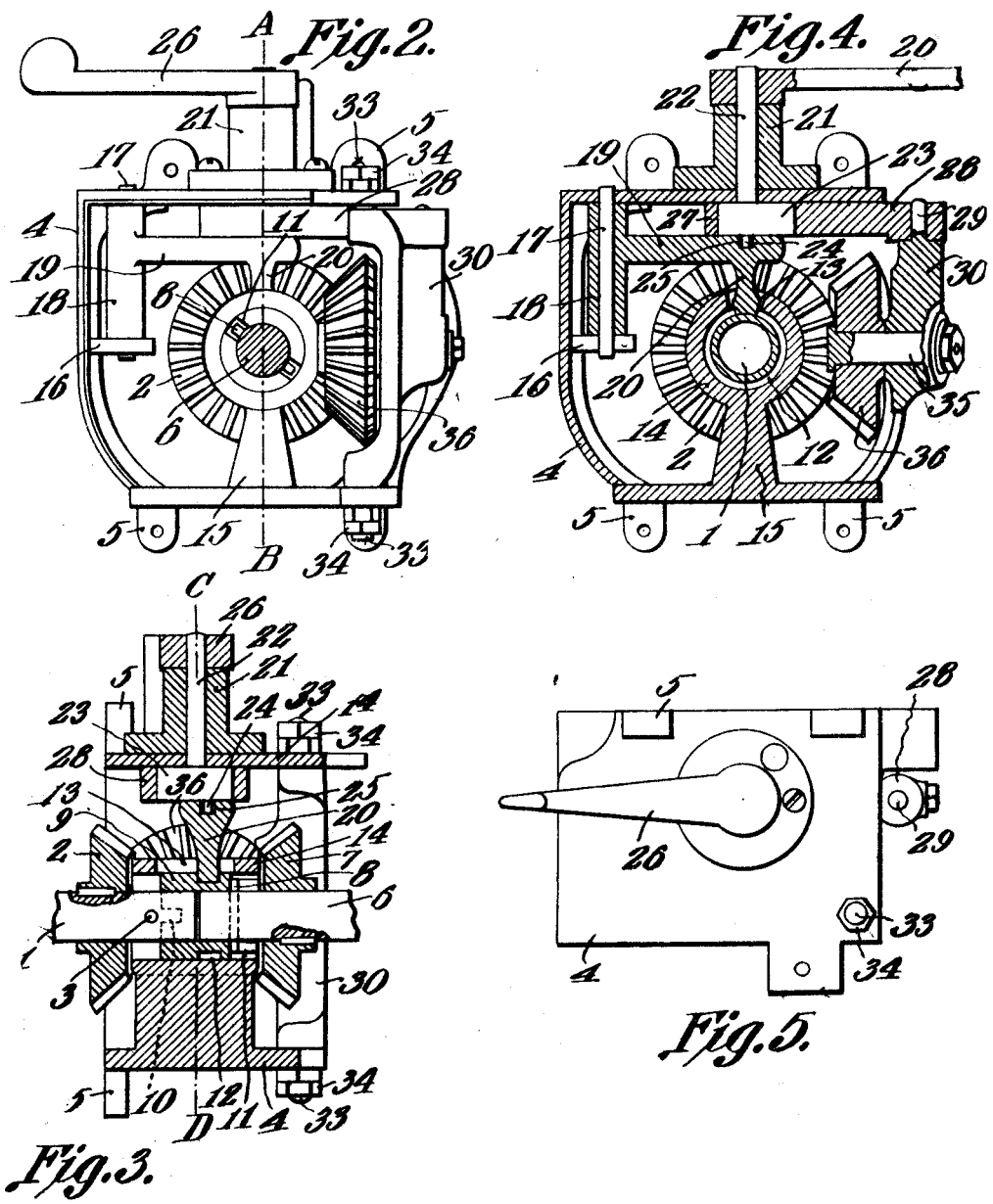

UNITED STATES PATENT OFFICE.

RICHARD LEDDICOAT WEARNE, OF BINGHAMTON, NEW YORK, ASSIGNOR TO BINGHAMTON WASHING MACHINE CO., OF BINGHAMTON, NEW YORK.

REVERSIBLE POWER-TRANSMISSION MECHANISM FOR WRINGERS.

1,071,119.      Specification of Letters Patent.      Patented Aug. 26, 1913.

Application filed December 16, 1912. Serial No. 737,065.

*To all whom it may concern:*

Be it known that I, RICHARD LEDDICOAT WEARNE, a citizen of the United States, residing at Binghamton, in the county of Broome and State of New York, have invented a new and useful Reversible Power-Transmission Mechanism for Wringers, of which the following is a specification.

This invention relates to power actuated clothes wringers and more particularly to power transmitting mechanism, one of the objects of the invention being to provide simple and compact mechanism of this character which can be coupled to a continuously rotating shaft and which is provided with means constantly under the control of the operator whereby the mechanism can be shifted so as to drive the rollers in either direction desired or to entirely disconnect them, operatively, from the drive shaft.

With the foregoing and other objects in view which will appear as the description proceeds, the invention resides in the combination and arrangement of parts and in the details of construction hereinafter described and claimed, it being understood that changes in the precise embodiment of the invention herein disclosed, can be made within the scope of what is claimed, without departing from the spirit of the invention.

In the accompanying drawings the preferred form of the invention has been shown.

In said drawings:—Figure 1 is a front elevation of a portion of a wringer having the present improvements combined therewith, the gear casing being broken away. Fig. 2 is an outer end elevation of the gear casing and showing the parts therein, the drive shaft being shown in section and the shifting lever being illustrated in one of its positions. Fig. 3 is a section on line A—B Fig. 2. Fig. 4 is a section on line C—D Fig. 3, the shifting lever being shown in a position opposite to that shown in Fig. 2. Fig. 5 is a plan view of the gear casing. Fig. 6 is a perspective view of the clutch sleeve. Fig. 7 is a detail view of the clutch shifting lever. Fig. 8 is a perspective view of the swinging gear carrying block. Fig. 9 is a detail view of a link used in actuating said block. Fig. 10 is a perspective view of the link actuating eccentric and adjacent parts.

Referring to the figures by characters of reference E designates a portion of a wringer frame in which rollers F and G are mounted, the roller G being provided with a shaft 1, one end of which projects beyond one side of the frame E and has a bevel gear 2 keyed or otherwise secured thereto. The end of the shaft projects beyond the face of the gear and has a pin 3 extending diametrically therethrough, the ends of the pin projecting outwardly from the shaft.

A substantially rectangular gear casing 4 is mounted upon one side of the frame E and has upwardly and downwardly extending ears 5 adapted to be secured to the frame E by means of screws or in any other suitable manner. The inner and outer ends of the gear casing are open and the projecting end of shaft 1 extends into one open end of the casing. Secured to the casing 4 is another casing H into the lower portion of which extends a driven shaft I while another shaft 6 extends horizontally from one end of this casing H and projects into one open end of the casing 4 so as to thus be disposed in alinement with the shaft 1.

Any suitable mechanism, not shown, may be employed for transmitting motion from a drive wheel J to the shafts 6 and I. Inasmuch as this mechanism does not constitute any part of the present invention, it has not been illustrated.

A bevel gear 7 is keyed or otherwise fixedly secured to the shaft 6 and one end of the shaft projects beyond the face of this gear and is provided with a diametrically disposed pin 8, the ends of which extend beyond the surface of the shaft. Slidably mounted upon the end portions of the shafts 1 and 6 and between the gears 2 and 7, is a coupling sleeve 9 provided with diametrically opposed notches 10 in one end and with deeper diametrically opposed notches 11 in its other end. These notches are so disposed that, when the sleeve 9 is shifted in one direction, the pin 8 projects into the notches 11 while the ends of pin 3 are removed from the notches 10. Thus it will be seen that sleeve 9 will rotate with shaft 6 but will not transmit power to shaft 1. When, however, sleeve 9 is shifted in the opposite direction, the shallow notches 10 will receive the ends of pin 3 before the sleeve is withdrawn from engagement with pin 8, and therefore, said sleeve will act as a coupling for transmitting power directly from shaft 6 to the shaft 1. An annular groove 12 is formed in the outer surface of the sleeve 9 at a point between the notches 10 and 11 and this groove extends across a slot 13 formed in the top portion of a bearing 14, which, as shown, is supported by and is preferably formed integral with a block 15 formed on or secured to the bottom of the casing 4.

An ear 16 extends inwardly from one side of the casing 4 and receives the lower end of a pivot pin 17, the upper end of this pin being extended into the top of casing 4. A sleeve 18 is mounted for rotation on the pivot pin 17 and has an arm 19 extending radially therefrom, this arm being provided with a downwardly extending finger 20 which projects through and is adapted to slide within the slot 13 and also projects into the annular groove 12. Thus it will be seen that when the arm 19 is swung about its pivot 17, the finger 20 will operate to shift the clutch sleeve 9 longitudinally upon the shafts 1 and 6 so as to couple or uncouple the said shafts, as desired.

A bearing block 21 is secured upon the top of casing 4 and has a shaft 22 journaled therein. The lower end of this shaft is provided with an eccentric 23 and a wrist pin 24 extends downwardly from the eccentric and projects into a recess 25 formed in the arm 19. An actuating lever 26 is secured to the upper or outer end of shaft 22 and, by means of this lever, the said shaft can be rotated and the wrist pin caused to swing the arm 19 so as thus to move the clutch sleeve 9. The eccentric 23 is mounted for rotation within a circular opening 27 formed within one end portion of a link 28. The other end portion of this link is pivotally mounted on a pin 29 extending upwardly from a block 30. This block is provided, at one side, with upper and lower inwardly extending ears 31 adapted to lie close to the top and bottom respectively of the casing 4. Recesses 32 are formed in those faces of the ears adjoining the top and bottom of the casing and are designed to receive the ends of bearing screws 33, said screws being held against displacement by means of lock nuts 34. Inasmuch as the pin 29 is disposed at one side of the screws 33, it will be apparent that when the eccentric 23 is rotated, the link 28 will pull upon the pin 29 and thus cause the block 30 to swing inwardly or outwardly, according to the direction in which the eccentric is rotated. A shaft 35 is secured in the block 30 below pin 29 and mounted for rotation on this shaft is a bevel intermediate gear 36. This gear is adapted, when the block is swung inwardly, to assume a position between and in mesh with both of the gears 2 and 7 but, when the block 30 is swung outwardly, said gear 36 is withdrawn from mesh with the two gears 2 and 7.

It is to be understood that shaft 6 is rotated continuously during the movement of the drive wheel J unless said drive wheel is disconnected from said shaft by means of suitable clutch mechanism which may be provided for that purpose. When it is desired to drive shaft 1 in one direction, lever 26 is shifted so as to cause the eccentric 23 to rotate. This eccentric will push upon link 28 and swing block 30 outwardly, thereby removing gear 36 from mesh with gears 2 and 7. At the same time pin 24 will shift the arm 19 and cause sleeve 9 to be moved longitudinally so as to bring the shallow notches 10 into position with the pin 3 therein. Thus shafts 1 and 6 will be directly connected and power will be transmitted from shaft 6 through the clutch sleeve 7 to the shaft 1. By swinging lever 26 through about 90 degrees, the eccentric 23 and the pin 24 will operate to swing block 30 inwardly and likewise to actuate arm 19 so as to bring the gear 36 nearer but still out of mesh with gears 2 and 7 and to shift the sleeve 9 out of engagement with the pin 3. Thus it will be seen that shaft 6 can continue to rotate without actuating shaft 1. By now continuing the movement of lever 26 until it is brought to a position opposite to its original position, eccentric 23 will pull on link 28 and cause block 30 to swing inwardly to such an extent as to bring gear 36 into mesh with both of the gears 2 and 7. During this movement, sleeve 9 will likewise be shifted farther away from the pin 3, this movement being permitted in view of the fact that the notches 11 are much deeper than the notches 10. As soon as the gears are brought into mesh in the manner described, power will be transmitted from gear 7 through gear 36 to gear 2 and shaft 1 will thus be rotated in a direction opposite to that in which shaft 6 is rotating.

It will be apparent that the mechanism constituting the present invention is advantageous because of its simplicity and compactness, it being thus particularly useful in connection with clothes wringers inasmuch as it can be applied readily to one side of the frame of the wringer without adding objectionably to the size of the apparatus or marring the appearance thereof. Obviously however, the shifting mechanism can be used upon machines other than clothes wringers if so desired.

What is claimed is:—

1. The combination with a drive shaft and a driven shaft; gears upon said shafts, and a projection upon each shaft, said projections being located between the gears, of a coupling sleeve slidable on the shafts and between the gears, said sleeve having notches in its ends for the reception of the respective projections, said notches being of different depths, a movably supported intermediate gear, a revoluble shaft, and means actuated by the shaft for simultaneously shifting the sleeve upon the shafts and moving the intermediate gear into or out of mesh with the other gears.

2. The combination with a drive shaft and a driven shaft, a gear secured to each shaft, and a projection upon each shaft, said projections being located between the gears, of a coupling sleeve slidable upon the shaft and having projection receiving notches in its ends, said notches being of different depths, a member mounted for swinging movement, an intermediate gear shiftable therewith, a shaft, and separate means operated by the shaft for swinging said member to bring the intermediate gear into or out of mesh with the other gears and for shifting the sleeve upon the shafts.

3. The combination with a drive shaft and a driven shaft, gears secured thereto, and a projection upon each shaft, said projections being located between the gears, of a coupling sleeve slidably mounted on the shafts and having terminal notches to receive the respective projections, a bearing for the sleeve, a shifting finger slidable in the bearing and engaging the sleeve, an intermediate gear movably supported, a shaft, and separate means operated by the shaft for simultaneously shifting said finger and the intermediate gear to move said gear into or out of mesh with the other gears and to slide the sleeve.

4. The combination with a drive shaft and a driven shaft, gears secured to the respective shafts, and projections upon the shafts and between the gears, of a clutch sleeve slidably mounted on said shafts and having terminal notches for the reception of the respective projections, an arm mounted to swing, and having a finger thereon engaging and adapted to shift the sleeve, a member mounted to swing, an intermediate gear supportd thereby, a link connected to said member, a revoluble eccentric engaging the link, and a wrist pin upon the eccentric and engaging the arm.

5. The combination with a driving shaft and a driven shaft, and gears secured to the respective shafts, of a clutch slidably mounted on said shafts for coupling and uncoupling the shafts, an arm mounted to swing, means upon the arm for shifting the clutch, a member mounted to swing, an intermediate gear supported thereby, a revoluble eccentric, and separate means operated by the eccentric for moving the swinging member and the arm respectively.

6. The combination with alining drive and driven shafts and projections upon said shafts, of a sleeve slidably mounted on the shafts and having terminal notches for the reception of the respective projections, a bearing for the sleeve and having a slot therein, an arm mounted to swing, a finger upon the arm and extending through the slot and into engagement with the sleeve, a shaft mounted for rotation, and an eccentric element movable with the shaft and engaging the arm.

7. The combination with a gear casing, of alining drive and driven shafts projecting thereinto, opposed gears secured to the respective shafts, projections upon the shafts and between the gears, a sleeve slidable upon the shafts and having terminal notches for the reception of the respective projections, a block mounted to swing within the casing, an intermediate gear supported thereby, a shaft, an eccentric thereon, means operated by the eccentric for shifting the block relative to the casing, and means actuated by the shaft for shifting the sleeve upon the shafts.

8. The combination with a drive shaft and a driven shaft, and gears secured to the respective shafts, of a clutch slidably mounted on the shafts for coupling and uncoupling them, a member mounted to swing, an intermediate gear supported thereby, a revoluble eccentric, and separate means actuated by the eccentric for simultaneously shifting the clutch and swing said member.

In testimony that I claim the foregoing as my own, I have hereto affixed my signature in the presence of two witnesses.

RICHARD LEDDICOAT WEARNE.

Witnesses:
 WM. AHERN,
 ORD A. BRAZIE.